United States Patent [19]

Christenson et al.

[11] Patent Number: 4,778,233

[45] Date of Patent: Oct. 18, 1988

[54] STEERING MIRROR

[75] Inventors: Eric Christenson, Portland; Paul Allen, Beaverton, both of Oreg.

[73] Assignee: ATEO Corporation, Beaverton, Oreg.

[21] Appl. No.: 909,701

[22] Filed: Sep. 19, 1986

[51] Int. Cl.⁴ .............................................. G02B 26/10
[52] U.S. Cl. .................................... 350/6.6; 350/486; 350/487
[58] Field of Search .................. 350/6.1, 6.5, 6.6, 631, 350/632, 637–639, 486, 487, 371; 310/326, 329; 250/230, 234–236

[56] References Cited

U.S. PATENT DOCUMENTS

| | | | |
|---|---|---|---|
| 1,438,974 | 12/1922 | Wente | 350/487 |
| 3,645,603 | 2/1972 | Smith | 350/371 |
| 3,998,092 | 12/1976 | Maccabee | 350/486 |
| 4,129,930 | 12/1978 | Dragt | 350/486 |
| 4,328,442 | 5/1982 | Tanaka et al. | 310/326 |

Primary Examiner—John K. Corbin
Assistant Examiner—Loha Ben
Attorney, Agent, or Firm—Blakely, Sokoloff, Taylor & Zafman

[57] ABSTRACT

A steering mirror for use with a laser pattern generator. A reflective surface is mounted on a pivotally mounted extended member. A piezo electric crystal abuts the extended member and voltage applied to the crystal causes deformation of the crystal and ultimately movement of the reflective surface. A differential impedence transducer is coupled to the extended member to detect movement of the steering mirror. In this manner, the position of the mirror can be accurately controlled.

15 Claims, 2 Drawing Sheets

STEERING MIRROR

BACKGROUND OF THE INVENTION

1. FIELD OF THE INVENTION

This invention relates to the field of mechanisms for angularly deflecting energy beams, specifically in a pattern generation system

2. BACKGROUND ART

In the photolithographic fabrication of integrated circuits, films sensitive to radiant or particle energy are exposed in predetermined patterns to define circuit features. In some cases, the energy is passed through masks which contain the patterns, thereby selectively exposing a photoresist film on a semiconductor body. In other instances, the film is on a mask substrate and the film is exposed as a step in the making of the mask. Other times, the direction of the radiant energy itself is controlled to define patterns in the film. This can be done as part of making the mask or to directly "write" onto the photoresist film covering a semiconductor wafer. Several sources of radiant energy have been used, including ultraviolet light, visible light, coherent light, x-rays and electron beam (E-beam). Current technology utilizes lasers to fabricate masks by directing a laser beam and/or moving a work piece relative to the laser beam. One method for generating these masks utilizing lasers is found in U.S. patent application No. 758,344 filed July 24, 1985 entitled "Laser Pattern Generation Apparatus" and assigned to the assignee of the present invention, now abandoned.

In this system, a laser is used to write a pattern on a workpiece. The workpiece moves beneath the laser, which is held stationary. However, the accuracy required to write complex circuit patterns requires that the laser be adjusted relative to movement of the stage on which the workpiece rests.

One method of providing such adjustment is by use of steering mirror. The laser is reflected off the steering mirror, through an optical path including lenses and beam splitters, and ultimately onto the workpiece. By altering the angle at which the laser strikes the steering mirror, the point at which the beam strikes the workpiece can be controlled. This allows correction of relative beam/workpiece movement.

In the prior art, steering mirrors are mounted on a galvanometer. The galvanometer has the disadvantage of low torque resulting in slow frequency response. Additionally, the minimum angle of movement which can be detected when using the galvanometer limits the accuracy of such prior art systems.

Therefore, it is an object of the present invention to provide a steering mirror which can be operated with a maximum frequency response.

It is yet another object of the present invention to provide a steering mirror of minimum inertia. (Minimize forces transmitted to supporting structure.)

It is yet another object of the present invention to provide minimum energy (minimize heat dissipation to prevent thermal distortion of support and mechanism.)

It is another object of the present invention to provide a steering mirror which can be adjusted in small angles, providing a more accurate steering mirror.

It is yet another object of the present invention to provide a steering mirror with a position detection mechanism for more accurate positioning of a reflected beam.

SUMMARY OF THE PRESENT INVENTION

In the present invention, a steering mirror is mounted on the end of a pivotally mounted extended member. A piezo electric translator abuts the extended member. Voltage is applied to the piezo electric crystal, causing deformation of the crystal and deflection of the extended member, which ultimately deflects the mounted mirror assembly. The increments of deflection of the piezo electric crystal can be more precisely controlled than prior art, galvanometer systems. The present invention uses a differential impedance transducer to determine mirror position. Energy absorptive foam on each side of paddle adds damping to mechanical resonances. This decreases the gain of mechanical resonance allowing increased gain on feedback loop. The differential impedance transducer in combination with the increased accuracy of the piezo electric crystal deflection scheme, results in a steering mirror whose location and movement may be controlled to precise dimensions.

DETAILED DESCRIPTION OF THE INVENTION

In the following description, numerous specific details are set forth in order to provide a more thorough understanding of the present invention. However, it will be obvious, to one skilled in the art, that the present invention may be practiced without these specific details. In other instances, well known devices have not been shown in detail in order not to unnecessarily obscure the present invention.

Figure 1:
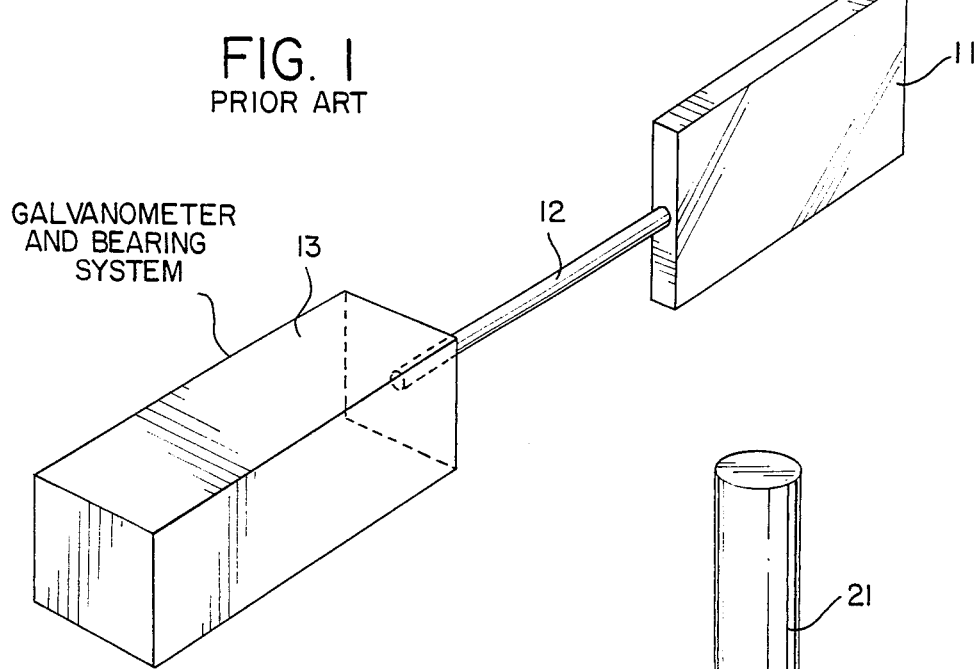
FIG. 1 illustrates a prior art steering mirror utilizing a galvanometer.
2.

A prior art steering mirror is illustrated in FIG. 1. The steering mirror consists of a reflective surface 11 axially mounted on a shaft 12 to a galvanometer and pivot bearing system 13. The use of a galvanometer creates a disadvantage with the prior art system. Galvanometer systems produce less torque per armature inertia than equivalent systems designed with piezo-electric crystals. This limits the frequency response of galvanometer systems to be less than is required for some pattern generation applications. These forces result in undesirable vibration.

In order to detect the mirror position, prior art systems use a single capacitive sensor. The use of a single sensor creates several disadvantages. Capacitive sensors are sensitive to changes in the temperature, humidity and barometric pressure of the ambient air, whereas impedance transducers are not. In addition, the differential configuration of the impedance transducers results in cancellation of other common mode errors in the mechanics and electronics of the system. Thus, the single capacitor sensor has worse repeatability and accuracy than the preferred embodiment described below.

Figure 2:
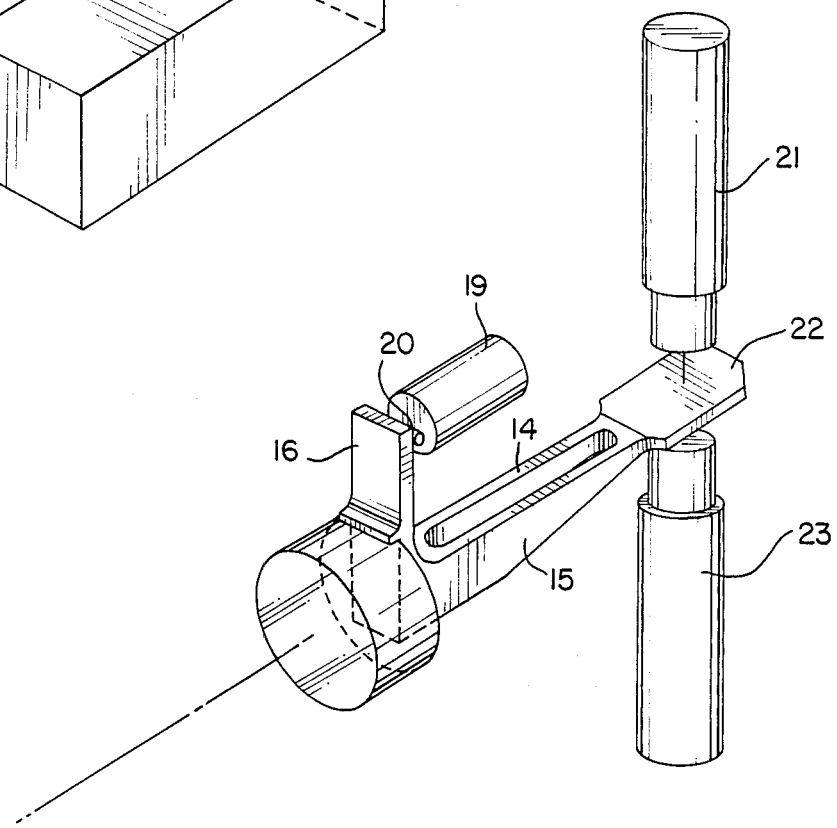
FIG. 2 is a perspective view of the preferred embodiment of the present invention.
3.

The preferred embodiment of the present invention is illustrated in FIG. 2. The steering mirror of the present invention comprises a reflective surface 17 mounted on a pivot arm 14. The pivot arm 14 includes arm 15 extending away from surface 17 in a substantially orthogonal direction and arm 16 extending parallel to and above surface 17. Pivot arm 14 is mounted to flexural pivots. Suitable flexural pivots are FREEFLEX pivots, manufactured by BENDIX. The end of arm 15 includes a flat paddle like extension 22 which is disposed between terminals 21 and 23 of a differential impedance transducer. Energy absorptive foam pads 26 are placed between the supporting structure and paddle 22. A piezo electric crystal 19 is coupled to arm 16 through mounting member 20. The piezo electric crystal 19 is coupled to a voltage source 24. As can be seen in the side view of FIG. 3, the pivot arm 14 is connected to the housing by flexural pivots 18.

In the preferred embodiment of the present invention, the steering mirror is used as part of a laser pattern generation system used to make masks for the processing of semiconductor chips. Such a device is described in U.S. patent application No. 758,344 filed July 24, 1985. The steering mirror is used to direct a laser beam onto a work piece. The work piece is mounted on a stage, and the entire stage moves beneath the laser, causing a pattern to be formed. To improve the accuracy with which patterns can be produced on a work piece, the position of the laser relative to movement of the stage must be continually adjusted. That is the function of the steering mirror.

Figure 3:
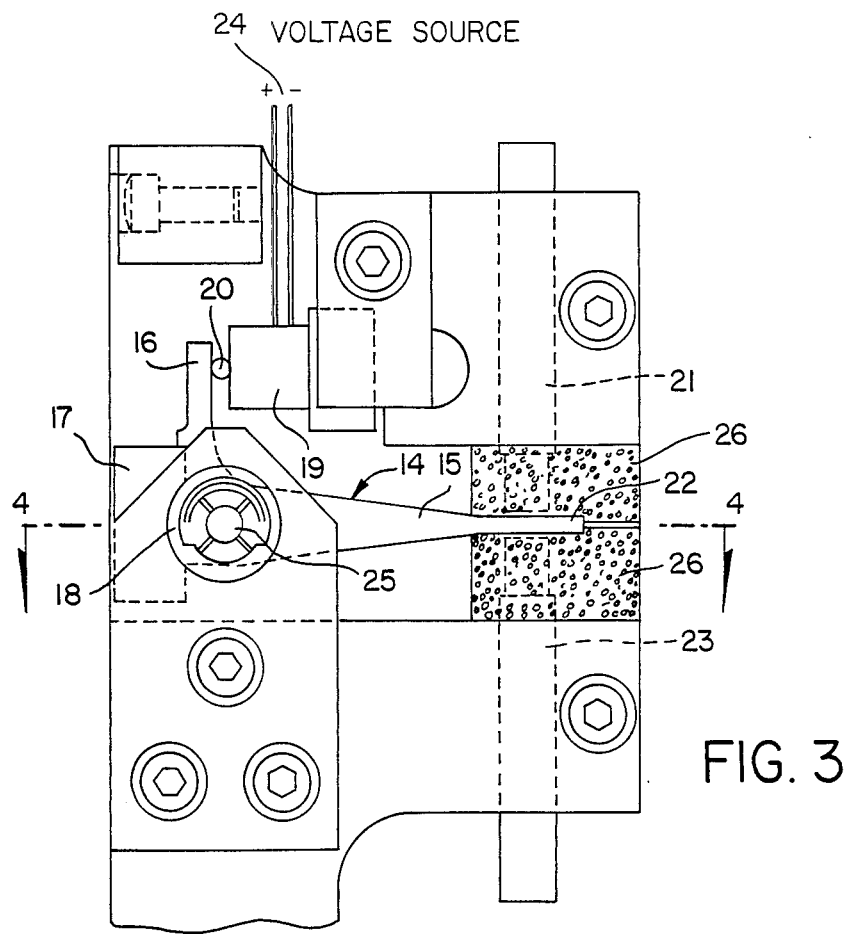
FIG. 3 is a side view of the preferred embodiment of the present invention as shown in FIG. 2.
4.
Figure 4:
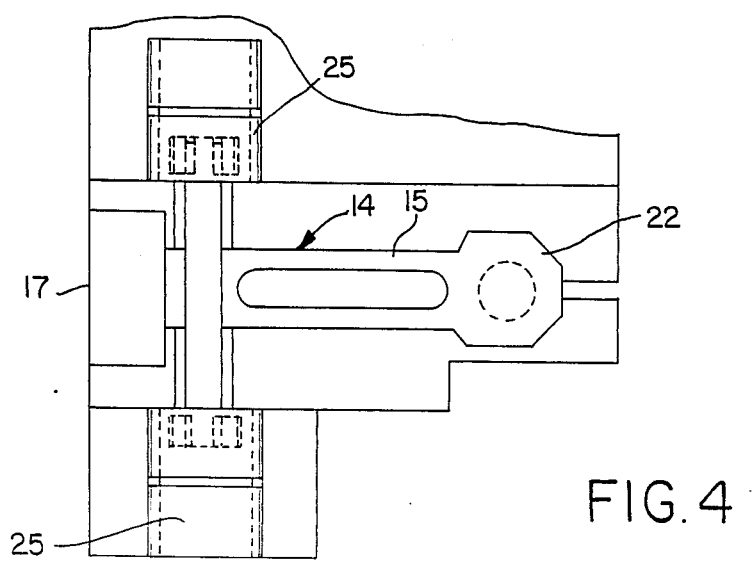
FIG. 4 is a top view of the preferred embodiment of the present invention as shown in FIG. 2.

In the preferred embodiment of the present invention, the steering mirror is adjusted by means of a piezo electric crystal 19 coupled to the pivot arm 14 of the steering mirror. As shown in FIG. 3, the piezo electric crystal 19 is coupled to arm 16 of the pivot arm through coupling member 20. The crystal 19 is also coupled to a voltage source 24 which can be adjusted in very small increments. Piezo electric crystals produce a voltage when deformed an correspondingly, deform when a voltage is applied to them. By utilizing this property, a sensitive servo mechanism may be provided for the steering mirror of the present invention. An additional advantage of the piezo electric crystal 19 is that it is extremely stiff. As a result, in the present invention the ratio of drive torque to mechanism inertia is very large allowing quicker starts and stops for movement of the steering mirror. This allows a large band width of movement to be utilized with the present invention.

In order to control the position of the steering mirror, the present invention utilizes a pair of differential impedance transducers 21 and 23. The extended panel 22 of arm 15 of the steering mirror extends between the transducers 21 and 23. As the piezo electric crystal 19 causes the steering mirror to deflect, the panel 22 moves towards transducer 21 and away from transducer 23 or vice-versa as the case may be. Each transducer outputs a signal which is dependent upon the relative position of the paddle 22. Thus, a differential signal is generated when the panel is closer to one of the transducers than the other. This differential signal is used to generate a position signal which is compared to the desired position signal and is used to control the voltage source 24 of the piezo electric crystal 19. When the desired position is reached, the voltage increase or decrease to the crystal ceases, causing the crystal to hold its current position. In this manner, very accurate positioning of the steering mirror takes place. Although the preferred embodiment of the present invention utilizes a pair of differential impedance transducers, other suitable detection means may be utilized. For example, the capacitive sensor used with prior art detection schemes may be utilized with the present invention.

The steering mirror of the present invention has particular application in a pattern generation system. As part of such a pattern generation system, mirrors are mounted on a stage holding the workpiece and on the writing lens of the laser beam system. Differential interferometers are used to track the position of the stage relative to the position of the beam. The output of the differential interferometer is coupled to the steering mirror of the present invention. When corrections are required between the writing beam and the stage on which the workpiece is held, the differential interferometer sends a signal to the steering mirror, causing deflection of the steering mirror. As noted above, the amount of deflection of the steering mirror can be determined and controlled by use of the differential impedance transducers.

In an alternate embodiment of the present invention, the piezo electric crystal 19 is disposed abutting arm 15. In this configuration, arm 16 is eliminated. Such a configuration further reduces the inertia of the pivot arm since the mass is reduced. In such configuration, the piezo electric crystal is disposed between the bearings 18 and the differential transducers 21 and 23. A second alternate embodiment extends the paddle section 22 of arm 15 beyond the transducers 21 and 23 and couples the piezo electric crystal 19 to the extended area.

Thus, a novel steering mirror has been described which operates at high band width using low energy and which may be moved at precisely determinable angles.

We claim:

1. A device for angularly deflecting an energy beam, said device comprising:
   a base;
   a member pivotally mounted on said base, said member having first and second ends;
   reflecting means coupled to said first end;
   displacement producing means coupled to said member for moving said member about a pivot;
   displacement detecting means disposed about said second end for detecting the movement of said member.

2. The device of claim 1 wherein said reflecting means comprises a mirror.

3. The device of claim 1 wherein said displacement producing means comprises a piezo electric crystal coupled to a voltage source and to said member.

4. The device of claim 1 wherein said displacement detecting means comprises a differential impedance transducer.

5. The device of claim 1 further including damping means coupled to said second end.

6. A device for deflecting an energy beam, said device comprising:
   a pivotally mounted member having first and second ends;
   an extended member coupled to said pivotally mounted member;
   reflecting means coupled to said first end;
   displacement producing means coupled to said extended member for moving said extended member, said extended member in turn moving said pivotally mounted member about a pivot;
   displacement detecting means disposed about said second end for detecting the movement of said pivotally mounted member.

7. A device of claim 6 wherein said reflecting member comprises a mirror.

8. The device of claim 6 wherein said displacement producing means comprises a piezo electric crystal.

9. The device of claim 6 wherein said displacement detection means comprises a differential impedence transducer.

10. The device of claim 6 wherein said extended member is mounted approximately orthogonally to said pivotally mounted member.

11. The device of claim 6 further including damping means coupled to said second end.

12. A device for angularly deflecting an energy beam in a pattern generation system, said device comprising:
   a base;
   a member pivotally mounted on said base, said member having first and second ends;
   a mirror mounted on said first end, said mirror reflecting said energy beam;
   displacement producing means coupled to said member for displacing said member and thereby changing the angle of said mirror with respect to said energy beam, said displacement producing means comprising a piezo electric crystal;
   displacement detecting means disposed about said second end for detecting the displacement of said second end with respect to said base.

13. The device of claim 12 wherein the displacement detecting means comprises a differential impedence transducer.

14. The device of claim 12 further including damping means coupled to said second end.

15. The device of claim 12 wherein said second end comprises a paddle shaped extension.

* * * * *

UNITED STATES PATENT AND TRADEMARK OFFICE
CERTIFICATE OF CORRECTION

PATENT NO. : 4,778,233

DATED : October 18, 1988

INVENTOR(S) : Christenson et al.

It is certified that error appears in the above-identified patent and that said Letters Patent is hereby corrected as shown below:

[73] ASSIGNEE: delete "ATEO" insert --ATEQ--

| Column | line | Discription |
|---|---|---|
| 01 | 28-32 | delete "One method for generating these masks utilizing lasers is found in U.S. patent application No. 758,344 filed July 24,1985 entitled "Laser Pattern Generation Apparatus" and assigned to the assignee of the present invention, now abandoned." | insert --One method for generating these masks utilizing lasers is found in U.S. Patent No. 4,796,038 filed March 28, 1988 titled "Laser Pattern Generation Apparatus" which is a continuation of serial No. 867,205, filed May 27, 1986, now abandoned, all assigned to the assignee of the present invention.--

Signed and Sealed this

Fourteenth Day of November, 1989

Attest:

JEFFREY M. SAMUELS

Attesting Officer     Acting Commissioner of Patents and Trademarks